US009562827B2

(12) United States Patent
Tanigawa et al.

(10) Patent No.: US 9,562,827 B2
(45) Date of Patent: Feb. 7, 2017

(54) MEASURING METHOD OF LONGITUDINAL DISTRIBUTION OF BENDING LOSS OF OPTICAL FIBER, MEASURING METHOD OF LONGITUDINAL DISTRIBUTION OF ACTUAL BENDING LOSS VALUE OF OPTICAL FIBER, TEST METHOD OF OPTICAL LINE, MANUFACTURING METHOD OF OPTICAL FIBER CABLE, MANUFACTURING METHOD OF OPTICAL FIBER CORD, AND MANUFACTURING METHOD OF OPTICAL FIBER

(75) Inventors: Shoji Tanigawa, Sakura (JP); Itaru Ishida, Sakura (JP); Shoichiro Matsuo, Sakura (JP); Toshio Kurashima, Tsukuba (JP); Kazuhide Nakajima, Tsukuba (JP); Tomoya Shimizu, Tsukuba (JP); Takashi Matsui, Tsukuba (JP); Yukihiro Goto, Tsukuba (JP)

(73) Assignees: FUJIKURA LTD., Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1399 days.

(21) Appl. No.: 13/213,506

(22) Filed: Aug. 19, 2011

(65) Prior Publication Data
US 2012/0042696 A1 Feb. 23, 2012

(30) Foreign Application Priority Data
Aug. 20, 2010 (JP) .................................. 2010-185320

(51) Int. Cl.
*G01M 11/00* (2006.01)
(52) U.S. Cl.
CPC ......... *G01M 11/39* (2013.01); *G01M 11/3145* (2013.01)

(58) Field of Classification Search
CPC ... G01M 11/30; G01M 11/31; G01M 11/3109; G01M 11/3127; G01M 11/3136; G01M 11/3145; G01M 11/3163; G01M 11/33; G01M 11/39
See application file for complete search history.

(56) References Cited

U.S. PATENT DOCUMENTS 4,243,320 A * 1/1981 Gordon .................. G01B 11/02
356/73.1
4,397,551 A * 8/1983 Bage .................... H04B 10/071
356/73.1
(Continued)

FOREIGN PATENT DOCUMENTS

CN 1 01 241 040 A 8/2008
CN 101447832 A 6/2009
(Continued)

OTHER PUBLICATIONS

Office Action issued by Dutch Patent Office in NL Application No. 2007280 dated Jul. 11, 2013.
(Continued)

*Primary Examiner* — Gordon J Stock, Jr.
(74) *Attorney, Agent, or Firm* — Sughrue Mion, PLLC

(57) ABSTRACT

A measuring method of a longitudinal distribution of bending loss of an optical fiber includes calculating an arithmetical mean value I(x) from two backscattering light intensities of two backscattering light at a position x obtained by bidirectional OTDR measurement of the optical fiber; and obtaining a bending loss value at the position x from a mode field diameter 2W(x) and a relative refractive index difference Δ(x) at the position x calculated from the arithmetical mean value.

18 Claims, 3 Drawing Sheets

(56) References Cited

U.S. PATENT DOCUMENTS

| | | | |
|---|---|---|---|
| 4,749,247 A * | 6/1988 | Large | G02B 6/2931 356/73.1 |
| 5,130,535 A | 7/1992 | Kummer et al. | |
| 6,456,370 B1 | 9/2002 | Ingles, Jr. | |
| 7,099,545 B2 * | 8/2006 | Sako et al. | 250/227.16 |
| 2010/0158460 A1 * | 6/2010 | Yoon | G02B 6/0283 385/124 |

FOREIGN PATENT DOCUMENTS

| | | |
|---|---|---|
| JP | 06-213770 A | 8/1994 |
| JP | 10-133036 A | 5/1998 |
| JP | 10-160633 A | 6/1998 |
| JP | 2007-298335 A | 11/2007 |

OTHER PUBLICATIONS

Office Action issued by Chinese Patent Office in Chinese Application No. 201110240969.2 mailed Feb. 8, 2014.
"Bend Loss of Slab and Fiber Modes Computed with Diffraction Theory", D. Marcuse, IEEE Journal of Quantum Electronics, vol. 29, No. 12, Dec. 1993, p. 2957-2961.
"Bending Losses of Coated Single-Mode Fibers: A Simple Approach", Hagen Renner, p. 544-551.
Jun-Ichi Yamamoto, et al., "Measurement technique of the fiber parameter distributions by using unidirectional OTDR", IEICE Technical Report OCS2005-89, pp. 1-6, 2006.
"Definitions and test methods for linear, deterministic attributes of single-mode fibre and cable", Series G: Transmission Systems and Media, Digital Systems and Networks, ITU-T G. 650.1, Jun. 2004.
"Measurement methods and test procedures—Macrobending loss", IEC International Standard, IEC 30793-1-47. Edition 3.0, Mar. 2009, pp. 1-6.
Alberto Rossaro, et al., "Spatially resolved Chromatic Dispersion Measurement by a Bidirectional OTDR Technique", IEEE Journal on Selected Topics in Quantum Electronics, May/Jun. 2001, pp. 475-483, vol. 7. No. 3.
Definitions and test methods for linear, deterministic attributes of single-mode fibre and cable, Series G: Transmission Systems and Media, Digital Systems and Networks, ITU-T G. 650.1, Jun. 2004.
"Measurement methods and test procedures—Macrobending loss", IEC International Standard, IEC 60793-1-47. Edition 3.0, Mar. 2009, pp. 1-6.

\* cited by examiner

MEASURING METHOD OF LONGITUDINAL DISTRIBUTION OF BENDING LOSS OF OPTICAL FIBER, MEASURING METHOD OF LONGITUDINAL DISTRIBUTION OF ACTUAL BENDING LOSS VALUE OF OPTICAL FIBER, TEST METHOD OF OPTICAL LINE, MANUFACTURING METHOD OF OPTICAL FIBER CABLE, MANUFACTURING METHOD OF OPTICAL FIBER CORD, AND MANUFACTURING METHOD OF OPTICAL FIBER

CROSS-REFERENCE TO RELATED APPLICATION

This application is based on and claims priority from Japanese Patent Application No. 2010-185320 filed in the Japanese Patent Office on Aug. 20, 2010, the contents of which are incorporated herein by reference.

BACKGROUND OF THE INVENTION

Field of the Invention

The present invention relates to a method of measuring the distribution of bending loss in the longitudinal direction of an optical fiber using a bidirectional OTDR measuring method, an optical line test method for detecting a failure position of bending loss using this measuring method, and a method of manufacturing an optical fiber having a small bending loss using this measuring method of bending loss distribution.

Background Art

As a technique of measuring the characteristics of the longitudinal distribution of an optical fiber, a technique referred to as a bidirectional OTDR measuring method is known (refer to IEICE Technical Report OSC2005-89 and ITU-Recommendations G. 650.1 (06/2004)).

A normal OTDR measuring method is a technique of acquiring backscattering optical waveforms (OTDR waveforms) in the longitudinal direction obtained from the time distribution of backscattering light of the pulse light that is incident from one end of an optical fiber, and obtaining information on a defect portion, a connection location, loss, and the like in the longitudinal direction of the optical fiber.

In the bidirectional OTDR measuring method, pulse light is entered from both ends of an optical fiber, and two OTDR waveforms are obtained from both ends bidirectionally.

Moreover, the distribution of a relative refractive index difference or a mode field diameter (hereinafter, refer to MFD) in the longitudinal direction of an optical fiber can be obtained by performing calculation processing of these two OTDR waveforms.

The bidirectional OTDR measuring method is a very useful tool in practice since characteristics distribution in the longitudinal direction of an optical fiber can be measured non-destructively.

Until now, in a method of measuring the longitudinal distribution of the optical properties of an optical fiber using the bidirectional OTDR measuring method, methods of measuring the relative refractive index difference, the MFD, a cut-off wavelength, and material dispersion are known.

However, a method of measuring the longitudinal distribution of bending loss that is one of the important optical properties of an optical fiber is not known.

On the other hand, for example, a method of carrying out a measuring method of bending loss described in IEC Standard Document IEC60793-1-47 Ed. 3 in a plurality of locations in the longitudinal direction of an optical fiber is considered.

However, in a location where this method is carried out, the optical fiber should be actually bent during the bending loss being measured.

For this reason, a problem occurs in that the locations where the bending loss can be measured is limited or the operation for obtaining the bending loss of a desired location becomes complicated.

In recent years, some bending loss insensitive fibers are proposed, and the importance of bending loss characteristics is increasing.

Accordingly, a technique capable of knowing bending loss characteristics distribution within an optical line or specifying a location having high bending loss within the optical line is desired.

SUMMARY OF THE INVENTION

The invention was made in order to solve the above problems, and realizes measurement of bending loss distribution in the longitudinal direction of an optical fiber by the bidirectional OTDR measuring method, obtains a test method of an optical line capable of detecting the bending loss distribution of an existing installed optical line and abnormal points of the optical line using this measuring method, and obtains a method of manufacturing an optical fiber with small bending loss using this measuring method.

In order to solve the above-described problems, a measuring method of a longitudinal distribution of bending loss of an optical fiber of a first aspect of the invention includes: calculating an arithmetical mean value $I(x)$ from two backscattering light intensities of two backscattering light at a position x obtained by bidirectional OTDR measurement of the optical fiber; and obtaining a bending loss value at the position x from a mode field diameter $2W(x)$ and a relative refractive index difference $\Delta(x)$ at the position x calculated from the arithmetical mean value.

In the measuring method of a longitudinal distribution of bending loss of an optical fiber of the first aspect of the invention, it is preferable that, when the bending loss value is obtained, an optical fiber to be measured be regarded as an optical fiber having a step refractive index profile effectively equivalent to the refractive index profile of the optical fiber, and the bending loss value at the position x be obtained from a relational expression between a normalized frequency V and a core radius a of an optical fiber having the step refractive index profile, and the mode field diameter $2W$.

In the measuring method of a longitudinal distribution of bending loss of an optical fiber of the first aspect of the invention, it is preferable that, when the mode field diameter $2W(x)$ at the position x is obtained, the mode field diameter $2W(x)$ be obtained from the arithmetical mean value $I(x)$, using mode field diameters at two reference points which are arbitrarily selected in the optical fiber.

A measuring method of a longitudinal distribution of actual bending loss value of an optical fiber of a second aspect of the invention includes obtaining the actual measured value of the bending loss value at the position x in the longitudinal direction, using the longitudinal distribution of the bending loss obtained by the above-described method, and using a bending loss value actually measured at least one point arbitrarily selected in the longitudinal direction.

A measuring method of a longitudinal distribution of bending loss of an optical fiber of a third aspect of the invention includes: deriving a mode field diameter 2W(x), using an arithmetical mean value I(x) calculated from two backscattering light intensities at a position x of two backscattering light waveforms obtained by bidirectional OTDR measurement of the optical fiber; and obtaining a bending loss value at the position x from a correlation between a mode field diameter 2W(x) and a bending loss value, the correlation between the mode field diameter 2W(x) and the bending loss value being obtained in advance.

In the measuring method of a longitudinal distribution of bending loss of an optical fiber of the first to third aspects of the invention, it is preferable that the optical fiber to be measured be a bending loss insensitive fiber.

In the measuring method of a longitudinal distribution of bending loss of an optical fiber of the first to third aspects of the invention, it is preferable that the bending loss insensitive fiber be an optical fiber with holes, an optical fiber having trenches, or an optical fiber having fine air bubbles.

In the measuring method of a longitudinal distribution of bending loss of an optical fiber of the first to third aspects of the invention, it is preferable that the optical fiber be installed.

A test method of an optical line of a fourth aspect of the invention includes detecting and identifying a defect position of bending loss of an installed optical line, using the measuring method of the first to third aspects of the invention.

A manufacturing method of an optical fiber cable of a fifth aspect of the invention includes: manufacturing an optical fiber cable from an optical fiber (first step), and detecting a defect position of bending loss of the manufactured optical fiber cable to measure the characteristics of the manufactured optical fiber cable, using the measuring method of the first to third aspects of the invention (second step).

A manufacturing method of an optical fiber cord of a sixth aspect of the invention includes: manufacturing an optical fiber cord from an optical fiber (first step), and detecting a defect position of bending loss of the manufactured optical fiber cord to measure the characteristics of the manufactured optical fiber cord, using the measuring method of the first to third aspects of the invention (second step).

A manufacturing method of an optical fiber of a seventh aspect of the invention includes: manufacturing an optical fiber (first step), and detecting a defect position of bending loss of the manufactured optical fiber to measure the characteristics of the manufactured optical fiber, using the measuring method of the first to third aspects of the invention (second step).

Effects of the Invention

According to the measuring method of the invention, it is possible to measure the longitudinal distribution of the bending loss that is one of the important optical properties of an optical fiber non-destructively.

Additionally, according to the test method of an optical line of the invention, the longitudinal distribution of the bending loss can be measured without repositioning or unsetting an optical fiber, as it is in a state where the optical fiber is actually used, that is, as it is in a state where the optical fiber is installed in a field.

Moreover, in an actually installed optical line, it is also possible to detect or specify a defect position resulting which is caused by the bending loss in the line.

Furthermore, according to the manufacturing method of the invention, since the longitudinal distribution of bending loss of an optical fiber is measured, and a location at which the measured value exceeds a predetermined threshold of bending loss value can be removed, an optical fiber that does not include a location having a high bending loss can be realized, and a highly qualified optical fiber can be manufactured.

DESCRIPTION OF THE PREFERRED EMBODIMENTS

Figure 1:
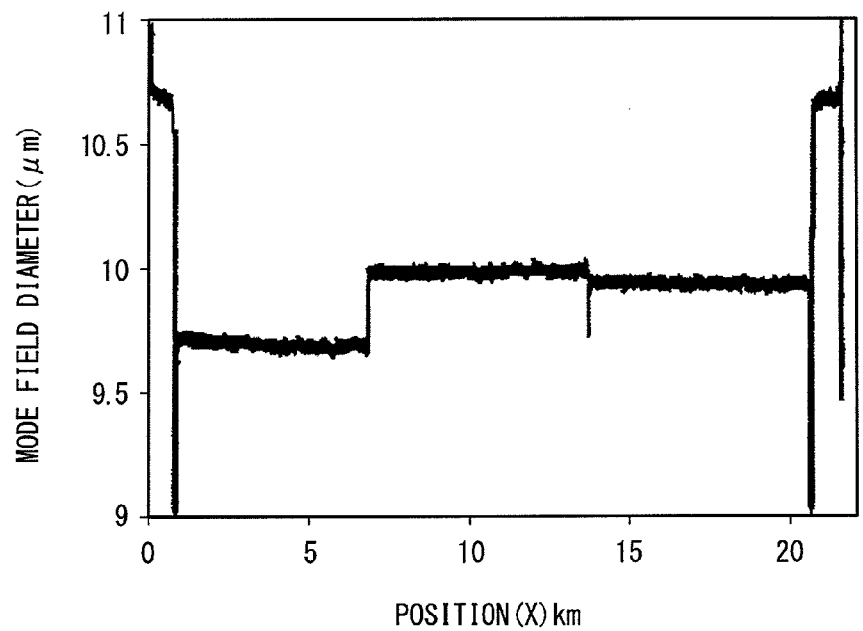
FIG. 1 is a graph showing the distribution of the MFD in the longitudinal direction of an optical fiber in Example 1.

Hereinafter, technical aspects of the invention will be described.

An arithmetical mean value I(x) obtained by the bidirectional OTDR measuring method is obtained from two backscattering light intensities at a position (x) in two backscattering optical waveforms.

This arithmetical mean value is generally referred to as imperfection loss, and is known to be an item regarding the capture rate of backscattering light.

The capture rate of backscattering light is correlated to the MFD of an optical fiber, and this correlation is expressed by the following Formula (1) using the MFD and an arithmetical mean value $I(x_0)$ at a certain reference point $(x_0)$.

$$2W(\lambda, x) = 2W(\lambda, x_0) \cdot 10^{\frac{I(\lambda, x_0) - I(\lambda, x) + k}{20}} \quad (1)$$

where $\lambda$ represents wavelength, and x represents a position in the longitudinal direction of the optical fiber. 2W is the MFD. k is a constant expressed by the following formula.

$$k = 10 \cdot \log\left[\left\{\frac{1 + 0.62\Delta(x)}{1 + 0.62\Delta(x_0)}\right\}\left\{\frac{50 - \Delta(x)}{50 - \Delta(x_0)}\right\}\right] \quad (2)$$

where $\Delta$ is a relative refractive index difference between the core and the cladding. Moreover, when two points ($x_0$ and $x_1$) are used as the reference points, Formula (1) can be expressed by the following formula.

$$2W(\lambda, x) = 2W(\lambda, x_0) \cdot \left[\frac{2W(\lambda, x_1)}{2W(\lambda, x_0)}\right]^{\frac{I(\lambda, x) - I(\lambda, x_0)}{I(\lambda, x_1) - I(\lambda, x_0)}} \quad (3)$$

On the other hand, the distribution in the longitudinal direction of the relative refractive index difference $\Delta$ is given by the following Formula (4) when the Rayleigh scattering coefficient R is described as $R = R_0(1 + k\Delta)$, on the basis of the conditions (the conditions generally satisfied in a general optical fiber) that the refractive index of glass in the longitudinal direction of the optical fiber hardly varies.

$$\Delta(x) = \frac{1}{k}\left[\{1 + k\Delta(x_0)\} \cdot 10^{\frac{I(\lambda,x) - 20\log\left\{\frac{2W(\lambda,x_0)}{2W(\lambda,x)}\right\}}{10}} - 1\right] \quad (4)$$

Generally, a calculation technique of assuming and handling an optical fiber having an arbitrary refractive index profile to be an optical fiber having a step-like refractive index profile effectively equivalent to the refractive index profile is known.

Also, in the embodiment described in the following, it is assumed that an optical fiber to be measured is an optical fiber having such a step-like refractive index profile, in calculating the longitudinal distribution of bending loss from the obtained arithmetical mean value I(x).

In the optical fiber having the step-like refractive index profile, it is generally known that the normalized frequency V and the MFD has a relation as in the following formula.

$$\frac{2W}{2a} = 0.65 + 1.619V^{-1.5} + 2.879V^{-6} \quad (5)$$

Here, 2a is a core diameter (a is a core radius) of the step-like refractive index profile optical fiber.

The longitudinal distribution a(x) of the core radius and the longitudinal distribution V(λ, x) of the normalized frequency can be obtained from Formula (1) or Formula (3), Formula (4) and Formula (5).

Additionally, the longitudinal distribution αb (λ, R, x) of bending loss in the bending radius R of the optical fiber to be measured can be derived by calculating the following Formula (6) using a(x) and V(λ, x) at a point arbitrarily selected in the longitudinal direction.

$$\alpha_b = \frac{\sqrt{\pi} \kappa^2 \exp\left\{-\frac{2R\gamma^3}{3\beta^2}\right\}}{2\gamma^{1.5} V^2 \sqrt{R} \{K_1(\gamma a)\}^2} \quad (6)$$

where $$u = 2.4048\exp(-0.8985/V)$$

$$\omega^2 = V^2 - u^2$$

$$\beta = \sqrt{\left(\frac{2\pi n_1}{\lambda}\right)^2 - \kappa^2}$$

$$\kappa = u/a$$

$$\gamma = \omega/a$$

Moreover, $K_1$ is a primary second kind modified Bessel function.

As described above, it is found that the MFD can be calculated from the arithmetical mean value I(x), and the longitudinal distribution αb(λ, R, x) of the bending loss can be derived from this MFD and the relative refractive index difference.

Although the optical fiber to be measured is assumed and handled to be an optical fiber having the step-like refractive index profile effectively equivalent to the refractive index profile in the aforementioned description, it is not necessary to set such an assumption if the longitudinal distribution of the bending loss can be appropriately derived.

Additionally, although reference points of two points (x0 and x1) are used in the relational expression of the MFD and the arithmetical mean value I(x), the number of reference points may be one.

Here, when the number of reference points is one, since the estimation precision of the MFD deteriorates, it is desirable that two points be referred to as the reference points.

At this time, the above-mentioned calculated value is very useful because it has certain proportional relationship with the actual bending loss value. However, it is known that there is a deviation between the calculated value of the bending loss of the longitudinal distribution αb of the calculated bending loss and the actual bending loss value. Thus, in order to obtain the actual bending loss value, it is necessary to adjust the deviation between the calculated value and the actual bending loss value using a method. That is, it can be said that the longitudinal distribution of the bending loss obtained by the above-described method represents only a change in relative bending loss.

Therefore, in order to obtain the actual bending loss value based on the calculated value of the bending loss value, the bending loss value at one point (may be two or more points) which is arbitrarily selected in the longitudinal direction by conventional measurement method is actually measured, and the distribution of actual measured value of the bending loss in the longitudinal direction from the ratio of the actual measurement and the calculated value at the point can be calculated.

Additionally, as a method which does not perform calculation according to a formula, a method of obtaining the longitudinal distribution of the bending loss from the correlation between the bending loss and the arithmetical mean value which are obtained in advance is adopted.

As the correlation for obtaining the longitudinal distribution of the bending loss, the correlation between the arithmetical mean value I(x) and the bending loss value may be directly used, or the MFD may be calculated from the arithmetical mean value I(x) according to the above-described Formula (1), and the correlation between this MFD and the bending loss value may be used.

Among such correlations, the estimation precision of the bending loss value is high when the MFD is calculated from the arithmetical mean value I(x) and the correlation between this MFD and the bending loss value is used.

For this reason, it is more desirable to use the correlation between the MFD and the bending loss value.

Additionally, the measuring method of the invention is more effective when the optical fiber to be measured is a bending loss insensitive fiber (often abbreviated as BIF).

Specifically, the bending loss insensitive fiber is an optical fiber that is made such that it is supposed that the optical fiber is bent with a very small bending diameter (for example, from a bending radius of approximately 5 mm to a bending radius of 15 mm) that is used inside of a house, inside a building, an MDU (multi-dwelling unit: facility for collective housing), or the like.

In such a bending loss insensitive fiber, it is important that the bending loss is stable and low in the longitudinal direction, and therefore it is more effective to use the measuring method of the invention for this type of optical fiber.

If a location where the bending loss is large is present in an installed optical line, and the optical fiber is bent at the location, a problem occurs in that the loss of signal light becomes large and transmission becomes impossible.

For this reason, it is very useful to apply this measuring method that can detect the longitudinal distribution of the bending loss non-destructively to such a bending loss insensitive fiber.

Additionally, the bending loss insensitive fiber is designed and manufactured so that the bending loss becomes very small.

As a practical matter, in the method of measuring the existing bending loss in a plurality of locations in the longitudinal direction of an optical fiber, it is difficult in practice to make an actual measurement while paying attention to variation in measurement values. If this measuring method is not used, the longitudinal distribution of the bending loss cannot be obtained with a high level of precision.

Furthermore, when an optical fiber with holes, an optical fiber having trenches, or an optical fiber having fine air bubbles in the structure of the optical fiber is used even in the bending loss insensitive fiber, the longitudinal distribution measurement of the bending loss according to this technique can be performed with a high level of precision.

This is because the above-described bending loss of the bending loss insensitive fiber is reduced by arranging a special cladding structure, such as a cladding layer with trench, a cladding layer with holes, or a cladding layer with fine air bubbles, which has a low refractive index, at a portion of cladding.

That is, a structural change in the longitudinal direction of the special cladding layer as described above contributes to a change in the longitudinal direction of the bending loss greatly than the structural change in a core.

Additionally, in the optical fiber as described above, the refractive index profile of the core of the optical fiber has the structure that may be referred to as substantially the step like.

A fluctuation in the longitudinal direction in optical properties which is caused by a structural change in the longitudinal direction of the core is small.

Therefore, there is an advantage that a fluctuation in bending loss which is caused by the longitudinal fluctuation of the special cladding layer is easily extracted from the arithmetical mean value I(x) obtained by the bidirectional OTDR, and it is possible to increase the estimation accuracy of the bending loss value.

Next, embodiments of optical fibers to which the measuring method of the invention can be applied will be described.

The optical fiber in the invention includes the following optical fiber configurations.

That is, the optical fiber is not limited to the configuration which is composed of one optical fiber, and includes the configuration in which the same kind or different kinds of two or more optical fibers are connected in series.

Additionally, as a type of the optical fiber, it is not limited to a particular type, and a single mode optical fiber, a multimode optical fiber, a dispersion shifted optical fiber, a dispersion compensating optical fiber, a polarization maintaining optical fiber, the aforementioned bending loss insensitive fiber, or the like is adopted.

Moreover, the embodiment, in which the optical fibers are connected to each other, includes all the forms, such as fusion splicing, connector connection, and connection by mechanical splicing.

Additionally, the optical fiber may be any of an optical fiber, a tight buffered optical fiber, an optical fiber cord, and an optical fiber cable.

Additionally, as the optical fiber cable, a single-core optical fiber cable or a multi-core optical fiber cable may be used.

As the embodiment of the optical fiber, if the embodiment of the optical fiber can be measured by the bidirectional OTDR even where the embodiment of the optical fiber cable or the optical fiber cord is adopted, the present measuring method can be applied to the embodiment.

In the form of the optical fiber cable or the optical fiber cord, it is possible to measure the bending loss value. Thus, even in the case where the optical fiber cable or the optical fiber cord can not be disassembled, the longitudinal distribution of the bending loss can be measured.

Additionally, in the invention, even in the configuration where optical fibers are connected in series, there is no hindrance to the measurement of the longitudinal distribution of bending loss. In the configuration where optical fibers are connected in series, it is possible to measure the longitudinal distribution of the bending loss as it is in the configuration.

Moreover, even if a connection location is in the state of being housed in a termination unit, such as a closure or an MDU, it is possible to apply the measurement direction of the invention.

Therefore, the longitudinal distribution of the bending loss can be measured as it is in a state where a configuration where optical fibers are connected in series is connected and housed (including a configuration where optical fiber cables or optical fiber cords are connected in series).

According to the measuring method of the invention, the longitudinal distribution of the bending loss can be measured without moving or removing an optical fiber, as it is in a state where the optical fiber is used in a practical manner, that is, as it is in a state where the optical fiber is installed in a field.

Here, the field may be the outdoors, may be the inside of a house or the inside of a building, may be the aerial, may be a buried form, or may be a tunnel, a manhole, or the undersea, and is not particularly limited.

Moreover, detection or identification of a defect position which is caused by the bending loss in an actually installed optical fiber line can also be carried out by this method.

When the bending loss is measured on an optical line (an object to be measured) installed in such the field, if it is possible to perform measurement using the bidirectional OTDR measuring method at one end of the optical line, this is advantageous in respect of cost from a viewpoint of facility installation.

Therefore, for example, as described in "DWDM Light Measurement Technique" (Pages 69 to 71) edited by Yoshinori Namihira in Optronics Co., Ltd., it is preferable to arrange a reflective coating, a reflector, or the like that performs total reflection at a far end of an optical fiber and to perform measurement (may be referred to as a total reflection OTDR measuring method) using the same measuring method as the bidirectional OTDR measuring method even at a near end of the optical fiber.

The arithmetical mean value I(x) at this time is calculated from backscattering light intensity at a position of distance x from the near end and backscattering light intensity at a position of distance 2L−x from the near end when the length of the optical line is defined as L.

Additionally, it is also possible to apply the measuring method of the invention, as an in-process test step in a manufacturing method of an optical fiber or optical fiber cable.

The manufacturing method of an optical fiber cable or optical fiber cord will be specifically described below.

First, an optical fiber cable or an optical fiber cord is manufactured by a routine method using an optical fiber (first step).

Thereafter, the characteristics of the optical fiber cable or the optical fiber cord that is obtained in the first step are measured (second step).

In such a manufacturing method, the longitudinal distribution of the bending loss is measured by the aforementioned measuring method in the second step, and a location at which the measured value exceeds a predetermined threshold of bending loss value is identified and removed in the second step.

Therefore, the optical fiber cable or optical fiber cord that does not include a location having a high bending loss can be realized.

Accordingly, it is possible to manufacture a highly qualified optical fiber cable or optical fiber cord.

Next, a manufacturing method of an optical fiber will be specifically described below.

Similarly to the above-described method, first, an optical fiber is manufactured by a routine method (first step).

Thereafter, the characteristics of the optical fiber obtained in the first step are measured (second step).

In such a manufacturing method, the longitudinal distribution of the bending loss is measured by the aforementioned measuring method in the second step, and a location at which the measured value exceeds a predetermined threshold of bending loss value is identified and removed in the second step.

Therefore, an optical fiber that does not include a location having a high bending loss can be realized.

Accordingly, it is possible to manufacture a highly qualified optical fiber. Hereinafter, examples will be shown.

Example 1

FIG. 1 shows graph showing test results of the distribution of the MFD in the longitudinal direction of an optical fiber tandem connection line obtained using Formula (3) from the arithmetical mean value obtained by the bidirectional OTDR measuring method of the optical fiber tandem connection line.

In this optical fiber tandem connection line, as shown in the graph of FIG. 1, five optical fibers constituted by a standard single mode optical fiber (up to approximately 1 km), three kinds of bending loss insensitive hole-assisted optical fibers (approximately 1 to 7 km, approximately 7 to 14 km, and approximately 14 to 21 km, respectively) having different bending loss levels, and a standard single mode optical fiber (approximately 21 to 22 km) are connected in series from a distance of 0 km that is the near end.

In the measuring method in the example, OTDR data was obtained from both ends (a location of 0 km and a location of approximately 22 km) of the tandem connection body using a commercially available OTDR measuring equipment.

The measurement wavelength is 1550 nm and pulse width is 100 ns.

In addition, the measurement wavelength or the pulse width is appropriately determined from the purpose or required resolution.

It is clearly observed from the measurement results by the bidirectional OTDR that a difference exists in the MFD of each optical fiber.

Additionally, the measurement results coincided with the MFD values which are actually measured separately using a technique described in ITU-T G. 650. 1 at the ends of each optical fiber.

On the basis of the data of FIG. 1, calculation of the longitudinal distribution of the bending loss was attempted.

Figure 2:
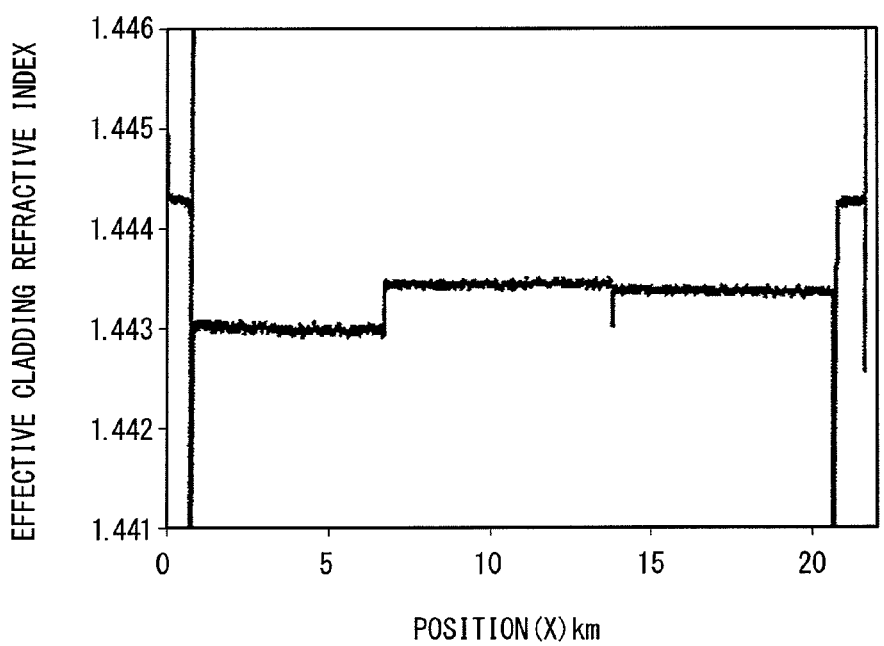
FIG. 2 is a graph showing the distribution of effective cladding refractive index in the longitudinal direction of the optical fiber in Example 1.

FIG. 2 shows calculated results of the longitudinal distribution of the refractive index obtained from Formula (4).

Here, the vertical axis of the graph shown in FIG. 2 is not the relative refractive index difference, but the effective refractive index of the cladding is plotted on the vertical axis thereof.

In a general bending loss insensitive fiber, the structural change in the cladding contributes to the fluctuation of the arithmetical mean value as mentioned above.

For this reason, in the bending loss insensitive fiber, a method of plotting the effective refractive index of the cladding in this way is suitable.

Here, as the effective cladding refractive index, the refractive index of the cladding when the aforementioned equivalent step-like refractive index profile is assumed is used.

Figure 3:
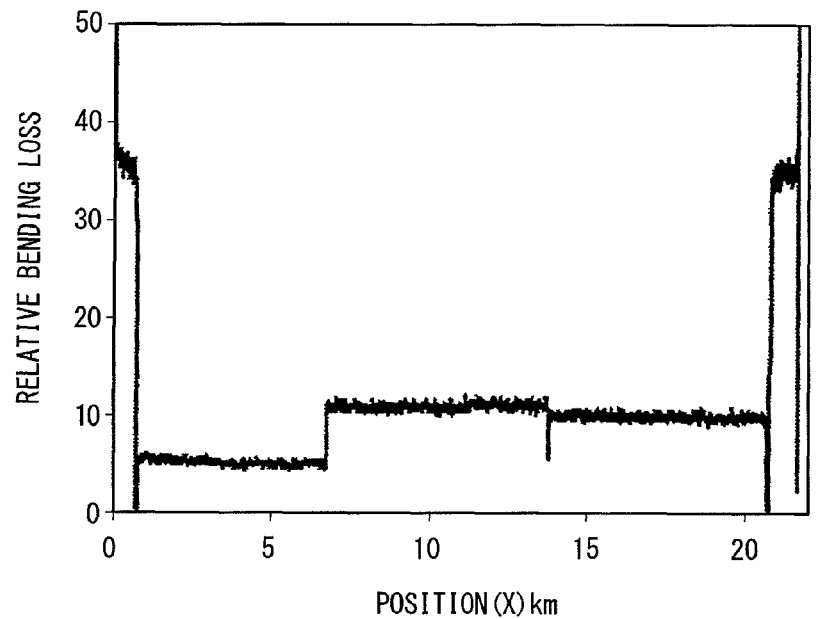
FIG. 3 is a graph showing the distribution of relative bending loss in the longitudinal direction of the optical fiber in Example 1.

Moreover, FIG. 3 shows the longitudinal distribution of the relative bending loss distribution obtained using Formula (5).

Here, it is noted that the bending loss in the vertical axis of the graph of FIG. 3 is the relative bending loss.

Generally, in the calculation of analytical bending loss, it is known that identification of an actual bending loss value is difficult, and only the distribution of the relative bending loss can be obtained.

In the example, as evidenced by FIG. 3, the longitudinal relative distribution of the bending loss is obtained.

Figure 4:
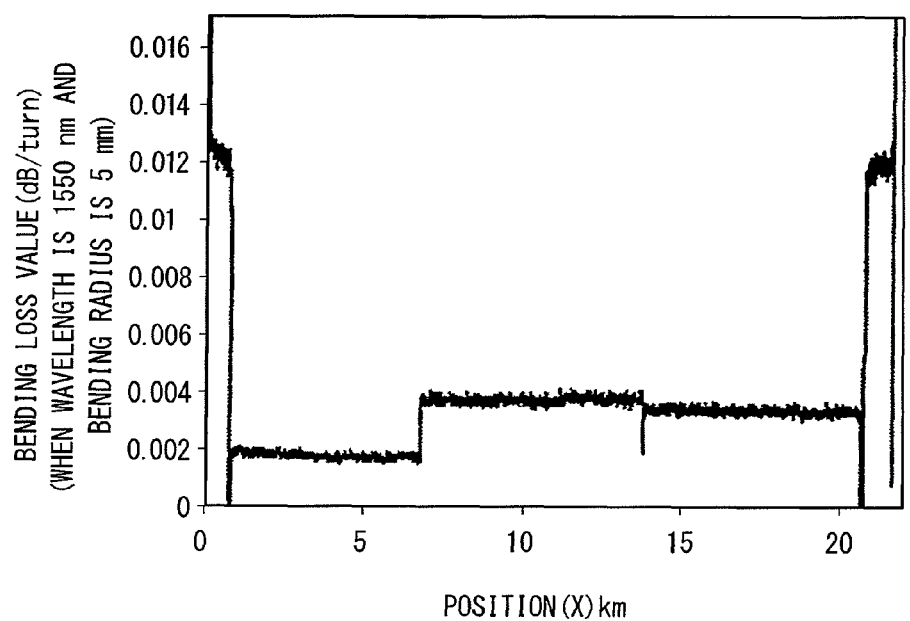
FIG. 4 is a graph showing the distribution of bending loss values in the longitudinal direction of the optical fiber in Example 1.

Next, FIG. 4 shows the longitudinal distribution of the bending loss distribution obtained by identifying relative values as actual bending loss value, using bending loss results (0.002 dB/1 turn, when a wavelength of 1550 nm, and bending radius of 5 mm) actually measured separately by a technique described in IEC60793-1-47 Ed. 3 at one point (a point of 1 km in the drawing) in the bending loss insensitive hole-assisted optical fiber, from the results shown in FIG. 3.

At this time, the relative values were converted into the actual bending loss value on the basis of the relation that the relative values of FIG. 3 is proportional to the actual bending loss value of the bending loss that were actually measured separately using IEC60793-1-47 Ed. 3 technique.

When the bending loss results that were actually measured separately by the technique described in IEC60793-1-47 Ed. 3 at each optical fiber end in other bending loss insensitive hole-assisted optical fibers was compared with the results of FIG. 4, both results coincided with each other within a range of measurement variation. From the above, it was confirmed that the longitudinal distribution of the bending loss can be obtained by the this measuring method.

Example 2

The longitudinal distribution of the bending loss was measured by a method of obtaining the longitudinal distribution of the bending loss on the basis of the correlation between the bending loss and the arithmetical mean value that are obtained in advance by actual measurement.

Figure 5:
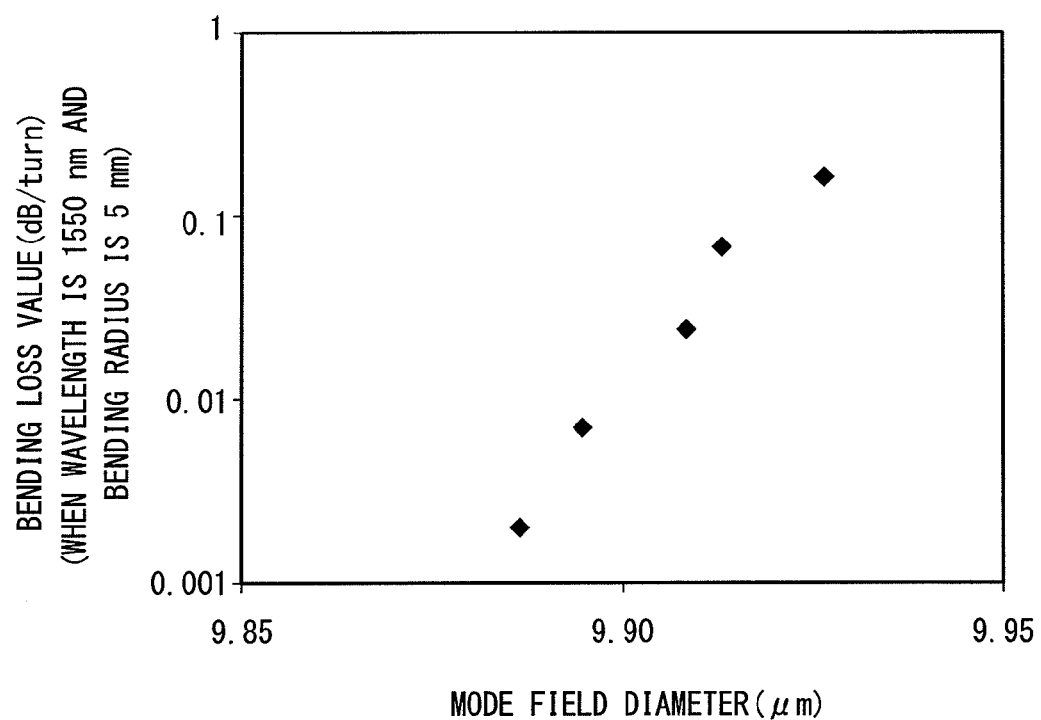
FIG. 5 is a graph showing the relationship between the MFD and bending loss values in Example 2.

FIG. 5 shows the relationship between the MFD measured by the method described in ITU-TG. 1 and the bending loss actually measured by the technique described in IEC60793-1-47 Ed. 3 in the bending loss insensitive hole-assisted optical fiber.

As apparent from FIG. 5, a very good correlation is seen between the MFD and the bending loss, and it can be confirmed that the correlation between the MFD and the bending loss can be approximated by an exponential function (that is, the logarithm of the MFD and the bending loss has a linear relation).

If such a relational expression is obtained in advance in an optical fiber having a predetermined structure, it is found that the longitudinal distribution of the MFD can be obtained by Formula (3) on the basis of the arithmetical mean value obtained by the bidirectional OTDR measuring method, and the longitudinal distribution of the bending loss of the optical fiber can be obtained from this longitudinal distribution of the MFD.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A measuring method of a longitudinal distribution of bending loss of an optical fiber, the method comprising:
   conducting a bidirectional OTDR measurement of the optical fiber in a longitudinal direction of the optical fiber;
   calculating an arithmetical mean value $I(\lambda, x)$ from two backscattering light intensities of two backscattering lights at a position x obtained by the bidirectional OTDR measurement of the optical fiber;
   obtaining a mode field diameter $2W(\lambda, x)$ and a relative refractive index difference $\Delta(x)$ between a core and a clad of the optical fiber at the position x and a wavelength $\lambda$, using the arithmetical mean value $I(\lambda, x)$, formula (2), formula (3), and formula (4):

$$k = 10 \cdot \log\left[\left\{\frac{1+0.62\Delta(x)}{1+0.62\Delta(x_0)}\right\}\left\{\frac{50-\Delta(x)}{50-\Delta(x_0)}\right\}\right] \quad (2)$$

$$2W(\lambda, x) = 2W(\lambda, x_0) \cdot \left[\frac{2W(\lambda, x_1)}{2W(\lambda, x_0)}\right]^{\frac{I(\lambda,x)-I(\lambda,x_0)}{I(\lambda,x_1)-I(\lambda,x_0)}} \quad (3)$$

and $$\Delta(x) = \frac{1}{k}\left[\{1+k\Delta(x_0)\} \cdot 10^{\frac{I(\lambda,x)-20\log\left\{\frac{2W(\lambda,x_0)}{2W(\lambda,x)}\right\}}{10}} - 1\right] \quad (4)$$

obtaining a bending loss value at the position x based on the mode field diameter $2W(\lambda, x)$ and the relative refractive index difference $\Delta(x)$ at the position x.

2. The measuring method of a longitudinal distribution of bending loss of an optical fiber according to claim 1, wherein when the bending loss value is obtained, an optical fiber to be measured is regarded as an optical fiber having a step refractive index profile effectively equivalent to the refractive index profile of the optical fiber, and the bending loss value at the position x is obtained from a relational expression between a normalized frequency V and a core radius a of an optical fiber having the step refractive index profile, and the mode field diameter 2W.

3. The measuring method of a longitudinal distribution of bending loss of an optical fiber according to claim 1, wherein when the mode field diameter $2W(\lambda x)$ at the position x is obtained, the mode field diameter $2W(\lambda, x)$ is obtained from the arithmetical mean value $I(\lambda, x)$, using mode field diameters at two reference points which are arbitrarily selected in the optical fiber.

4. The measuring method of a longitudinal distribution of bending loss of an optical fiber according to claim 1, wherein the optical fiber is installed.

5. A test method of an optical line comprising detecting and identifying a defect position of bending loss of an installed optical line, using the measuring method according to claim 1.

6. A manufacturing method of an optical fiber cable, the method comprising:
   manufacturing an optical fiber cable from an optical fiber, and
   detecting a defect position of bending loss of the manufactured optical fiber cable to measure the characteristics of the manufactured optical fiber cable, using the measuring method according to claim 1.

7. A manufacturing method of an optical fiber cord, the method comprising:
   manufacturing an optical fiber cord from an optical fiber, and
   detecting a defect position of bending loss of the manufactured optical fiber cord to measure the characteristics of the manufactured optical fiber cord, using the measuring method according to claim 1.

8. A manufacturing method of an optical fiber, the method comprising:
   manufacturing an optical fiber, and
   detecting a defect position of bending loss of the manufactured optical fiber to measure the characteristics of the manufactured optical fiber, using the measuring method according to claim 1.

9. The measuring method of a longitudinal distribution of bending loss of an optical fiber according to claim 1, wherein the optical fiber to be measured is a bending loss insensitive fiber.

10. A measuring method of a longitudinal distribution of actual bending loss value of an optical fiber, the method comprising obtaining an actual measured value of the bending loss value at the position x in the longitudinal direction, using the longitudinal distribution of the bending loss obtained by the method according to claim 1, and using a bending loss value actually measured at a point arbitrarily selected in the longitudinal direction.

11. The measuring method of a longitudinal distribution of bending loss of an optical fiber according to claim 9, wherein the bending loss insensitive fiber is an optical fiber with holes, an optical fiber having trenches, or an optical fiber having fine air bubbles.

12. The measuring method of a longitudinal distribution of actual bending loss value of an optical fiber according to claim 10, wherein the optical fiber is installed.

13. A test method of an optical line comprising detecting and identifying a defect position of bending loss of an installed optical line, using the measuring method according to claim 10.

14. A manufacturing method of an optical fiber cable, the method comprising:
   manufacturing an optical fiber cable from an optical fiber, and
   detecting a defect position of bending loss of the manufactured optical fiber cable to measure the characteristics of the manufactured optical fiber cable, using the measuring method according to claim 10.

15. A manufacturing method of an optical fiber cord, the method comprising:
   manufacturing an optical fiber cord from an optical fiber, and
   detecting a defect position of bending loss of the manufactured optical fiber cord to measure the characteristics of the manufactured optical fiber cord, using the measuring method according to claim 10.

16. A manufacturing method of an optical fiber, the method comprising:
   manufacturing an optical fiber, and
   detecting a defect position of bending loss of the manufactured optical fiber to measure the characteristics of the manufactured optical fiber, using the measuring method according to claim 10.

17. The measuring method of a longitudinal distribution of actual bending loss value of an optical fiber according to claim 10,
   wherein the optical fiber to be measured is a bending loss insensitive fiber.

18. The measuring method of a longitudinal distribution of actual bending loss value of an optical fiber according to claim 17,
   wherein the bending loss insensitive fiber is an optical fiber with holes.

* * * * *